United States Patent [19]

Romano

[11] Patent Number: 4,801,287
[45] Date of Patent: Jan. 31, 1989

[54] REAR DERAILER FOR BICYCLE GEARS
[75] Inventor: Antonio Romano, Padova, Italy
[73] Assignee: Campagnolo S.p.A., Vicenza, Italy
[21] Appl. No.: 207,486
[22] Filed: Jun. 16, 1988
[30] Foreign Application Priority Data Jun. 16, 1987 [IT] Italy .............................. 67517 A/87

[51] Int. Cl.$^4$ ............................................. F16H 11/08
[52] U.S. Cl. .................................................... 474/82
[58] Field of Search ................................... 474/78–82
[56] References Cited

U.S. PATENT DOCUMENTS 4,507,101 3/1985 Nagand ................................ 474/82
4,626,229 12/1986 Nagano ............................ 474/82 X

FOREIGN PATENT DOCUMENTS 2543639 10/1984 France ................................. 474/82

Primary Examiner—Thuy M. Bui
Attorney, Agent, or Firm—Sughrue, Mion, Zinn, Macpeak & Seas

[57] ABSTRACT

A rear derailleur for bicycle gears comprises an upper body which can be fixed to the bicycle frame and a lower body carrying chain transmission member and being movable relative to the upper body to bring the chain into selective engagement with a series of sprockets carried by the hub of the rear wheel of the bicycle. The lower body is connected by an articulated parallelogram joint to an intermediate connecting element which is in turn mounted for sliding on guide member carried by the upper body. Connecting rods are provided for univocally correlating the movements of the intermediate element relative to the upper body with the movements of the lower body relative to the intermediate element. In this way, the resulting movement of the lower body relative to the upper body has both a component along the axis of the hub of the rear wheel of the bicycle, and a component radial to that axis.

8 Claims, 5 Drawing Sheets

REAR DERAILER FOR BICYCLE GEARS

The present invention relates to rear derailleurs for bicycle gears, of known type comprising:

an upper body which can be fixed to the bicycle frame, a lower body carrying transmission means for the chain of the bicycle and being movable relative to the upper body to bring the chain into selective engagement with a series of sprockets carried by the hub of the rear wheel of the bicycle, and an articulated parallelogram joint which connects the lower body to the upper body.

In rear derailers of the aforesaid type, it is desirable, for efficient functioning of the derailleur, that the distance between the chain transmission means and the teeth of the sprocket meshed with the chain which are nearest to the transmission means is kept as uniform as possible whatever sprocket is selected. Various types of derailleur have already been proposed to obtain this result, in which the lower body is movable relative to the upper body in a direction which has both a component parallel to the axis of the hub of the rear wheel (to cause derailing from one sprocket to another) and a component radial to that axis (to compensate for the different diameters of the sprockets).

The object of the present invention is to provide a rear derailleur which satisfies the above requirement and which at the same time has a particularly simple and reliable structure.

In order to achieve this object, the subject of the present invention is a rear derailer of the type specified at the beginning, characterized in that the articulated parallelogram joint connects the lower body directly to an intermediate connecting element which is mounted for sliding on guide means carried by the upper body, and in that means are provided for univocally correlating the movements of the intermediate element relative to the upper body with the movements of the lower body relative to the intermediate element, so that the resulting movement of the lower body relative to the upper body has both a component along the axis of the rear wheel hub and a component radial to that axis.

According to a further characteristic, the intermediate connecting element is mounted for sliding on the guide means in a direction contained in a plane which is preferably perpendicular to the axis of the hub. The articulated parallelogram joint enables movement of the lower body relative to the intermediate element in a direction having a component along the axis of the hub. In this way, the aforementioned requirement to keep the distance between the chain transmission means and the selected sprocket as uniform as possible is satisfied.

In a first embodiment, the means which correlate the movements of the intermediate element relative to the upper body with the movements of the lower body relative to the intermediate element are constituted by a lever articulated at its ends to the upper body and the lower body respectively. In a second embodiment, however, these means are constituted by a cam coupling interposed between the upper body and an appendage of one of the connecting rods of the articulated parallelogram joint. Yet another embodiment, however, uses a toggle joint including at least one auxiliary connecting rod articulated at its ends to the upper body and an appendage of a connecting rod of the articulated parallelogram joint.

Further characteristics and advantages of the present invention will become clear from the description which follows with reference to the appended drawings, provided purely by way of non-limiting example, in which.

Figure 1:
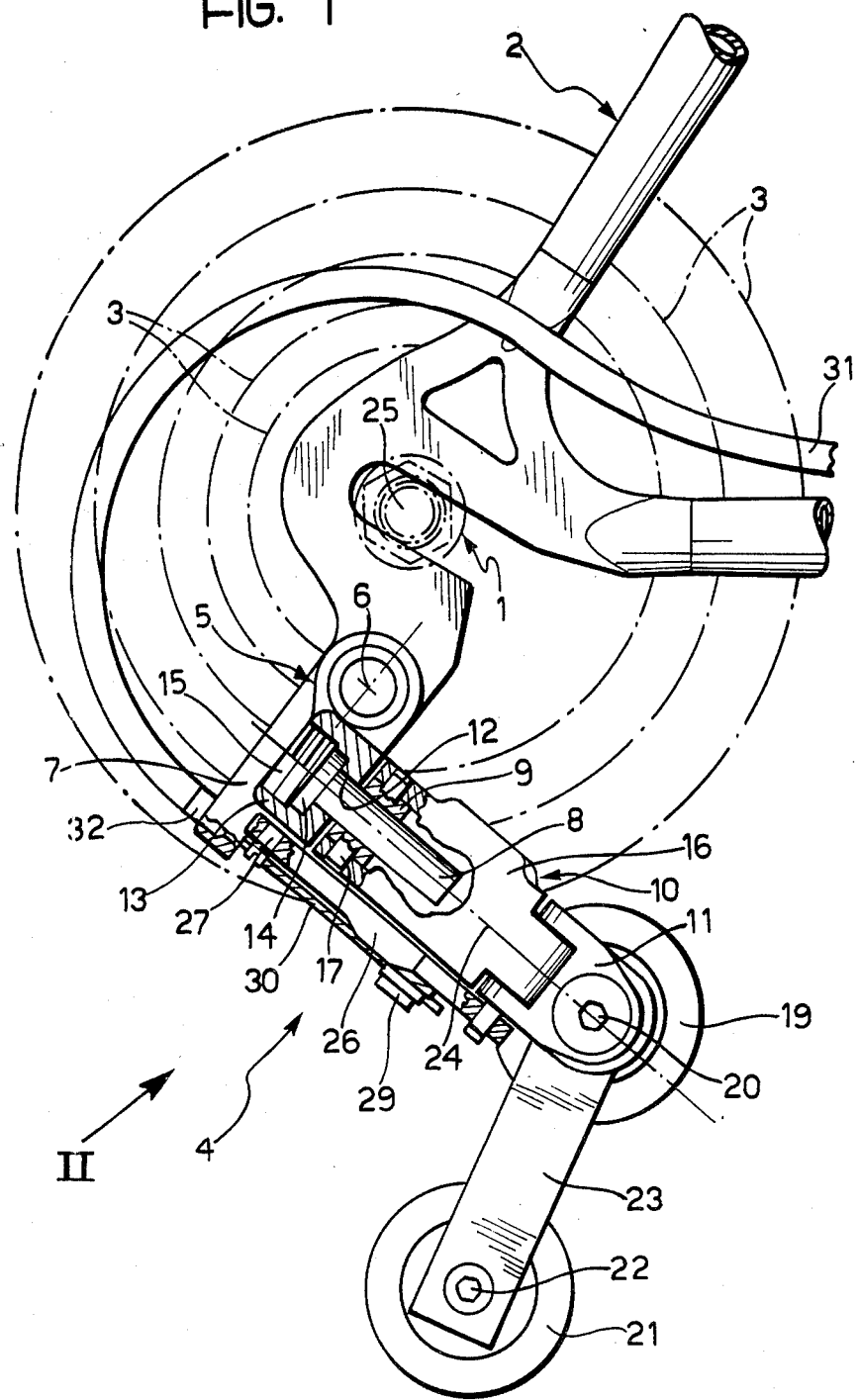
FIG. 1 is a view of a derailer according to the invention fitted to the bicycle frame, in a plane perpendicular to the axis of the rear wheel of the bicycle.
Figure 2:
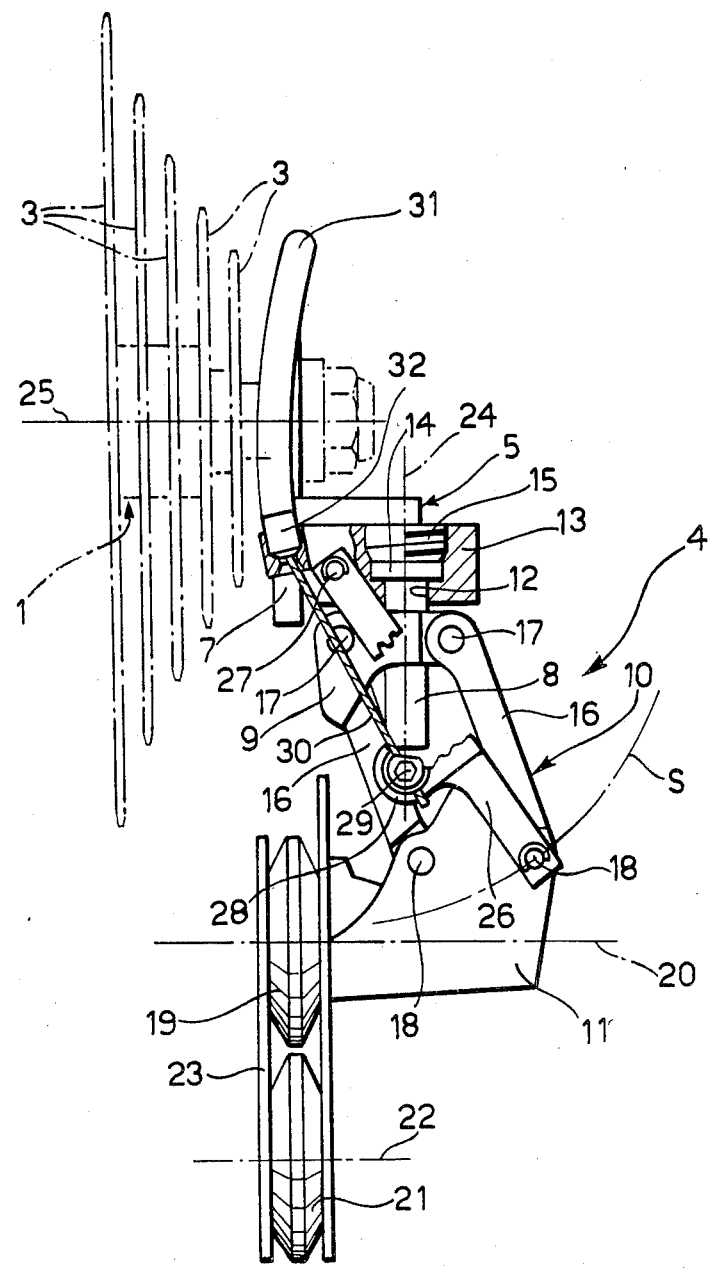
FIG. 2 is a view of the derailer of FIG. 1 taken on the arrow II of FIG. 1.
Figure 3:
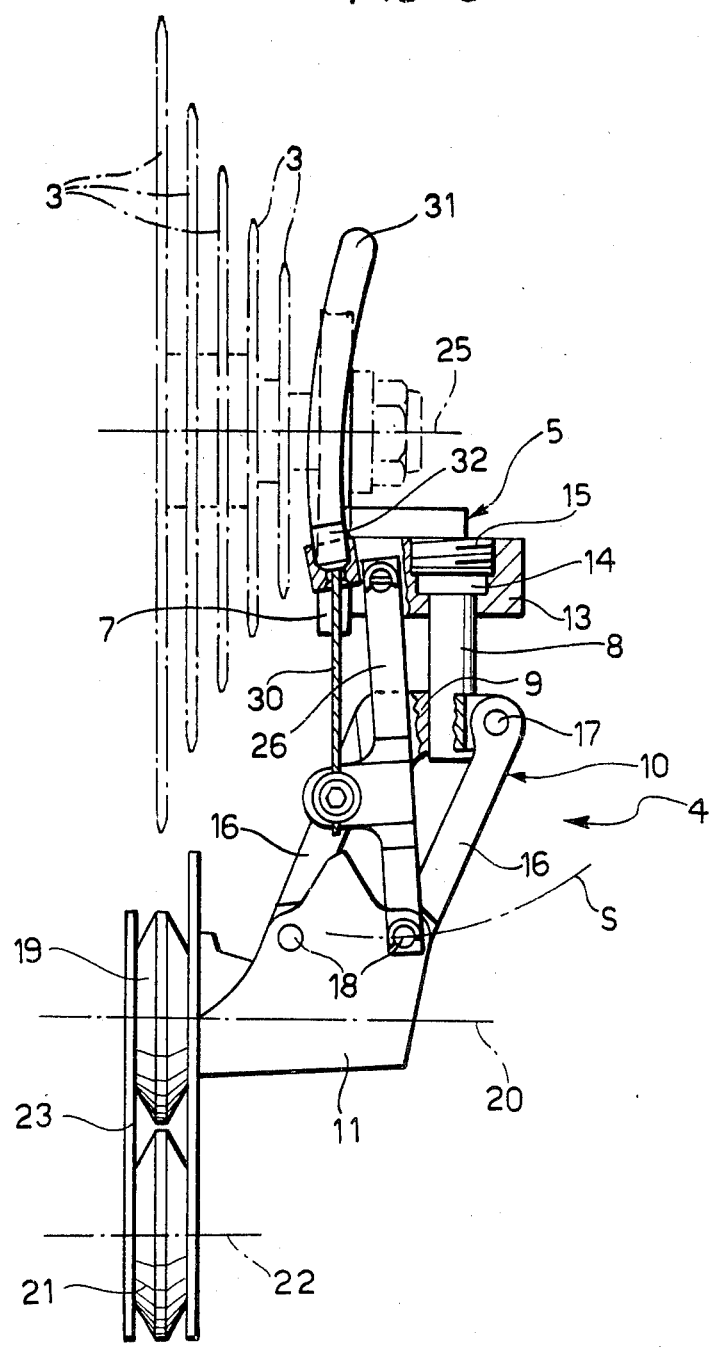
FIG. 3 illustrates the derailer of FIG. 2 in a different operating condition.

With reference to FIGS. 1–3, the hub (illustrated schematically by a broken line in the drawings) of the rear wheel of a bicycle is indicated 1 and is mounted on a part 2 of the bicycle frame. The hub 1 carries a series of sprockets 3 (also indicated only schematically by broken lines in the drawings) intended to engage the bicycle chain selectively to achieve the various transmission ratios. The rear derailleur of the bicycle is generally indicated 4 and comprises an upper body 5 which is fixed at 6 by means of a bolt (not illustrated) to an appendage 7 of the bicycle frame 2.

The upper body 5 of the derailer 4 carries a cylindrical guide pin 8 on which an intermediate connecting element 9 is slidably mounted (possibly with the interposition of a plastics bush). In its turn, the intermediate element 9 is connected by means of an articulated parallelogram joint 10 to a lower body 11 which carries the transmission means for the bicycle chain (which will be described in detail below).

In the embodiment illustrated, the guide pin 8 is mounted in a through-hole 12 formed in a part 13 of the upper body 5 and has a head 14 bearing on an annular abutment surface of the part 13 and locked in this position by means of a pin 15 screwed into a threaded, enlarged-diameter end portion of the hole 12. The intermediate connecting element 9, which constitutes the head of the articulated parallelogram joint 10, is connected to the lower body 11 by means of a pair of connecting rods 16. These rods are articulated to the head 9 by means of pins 17 and to the lower body 11 by means of pins 18. The chain transmission means comprise a first wheel 19 supported for rotation about an axis 20 for the lower body 11, and a second wheel 21 supported for rotation about an axis 22 by the free end of a pivoting lever 23 whose opposite end is articulated at 20 to the lower body 11. The lever 23 is resiliently biassed (by resilient means, not illustrated) towards a position in which the wheel 21 keeps the bicycle chain tensioned (not illustrated).

As is clear from FIG. 1, the cylindrical guide pin 8 has an axis 24 contained in a plane which is preferably perpendicular to the axis 25 of the hub 1. The head 9 of the articulated parallelogram joint 10 is thus movable in this direction relative to the upper body 5 of the derailleur. Moreover, by virtue of the articulated parallelogram joint 10, the lower body 11 is movable relative the intermediate connecting element 9 along an arcuate path which approximates to a straight line parallel to the axis 25 of the hub 1. The sliding of the element 9 on the cylindrical guide pin 8 and the pivoting of the articulated parallelogram joint 10 relative to the element 9 are independent of each other but, on the other hand, are univocally correlated due to the fact that the upper body 5 and the lower body 11 are interconnected directly by an auxiliary connecting rod 26. The connecting rod 26 is articulated to the upper body 5 by means of a pin screw 27 and to the lower body 11 by means of one of the two pins 18 used for articulation of the connecting rod 16. Naturally, it is also possible to achieve articulation of the rod 26 to the lower body 11 at a point spaced from the point of articulation of the connecting rod 16. The auxiliary connecting rod 26 has an appendage 28 to which the end of a flexible metal cable 30 for operating the derailleur is fixed by means of a fixing element 29, the cable 30 being situated within a sheath 31 whose end 32 is fixed to the appendage 7 body 5 and/or of the intermediate element 9 (FIG. 4–5) bicycle. By virtue of the auxiliary connecting rod 26, the lower body 11 moves relative to the upper body 5 along an arcuate path S (FIG. 2) which approximates to a straight line path having a component parallel to the axis 25 of the hub 1 and a component radial to that axis. The joint 10 ensures that the orientation of the axes 20, 22 does not change. In this way, the distance between the chain transmission wheel 19 and the teeth of the sprocket meshed with the chain which are nearest to the wheel varies little when different sprockets are selected.

Figure 4:
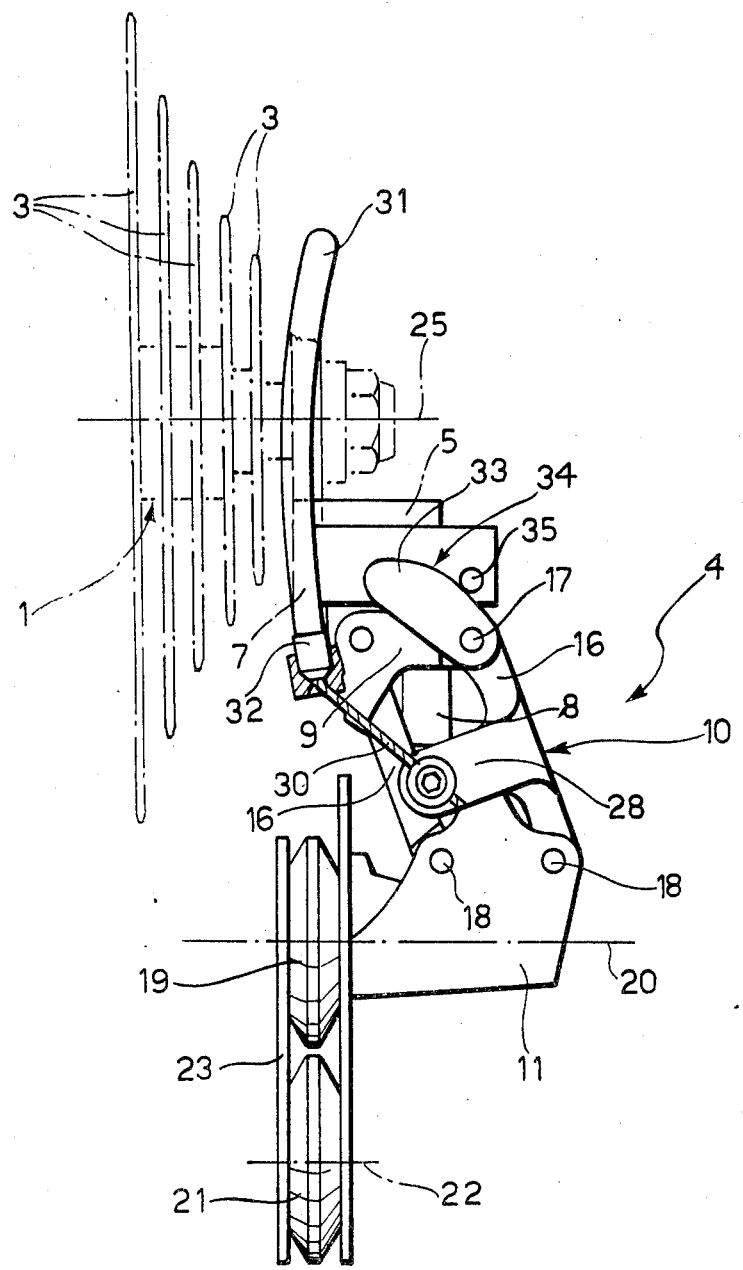
FIGS. 4 and 5 illustrate two variants of FIG. 2.

FIGS. 2, 3 illustrate the derailleur of FIG. 1 in two different positions corresponding respectively to engagement of the chain on the sprocket of smallest diameter and on the sprocket of largest diameter. FIG. 4 shows a variant in which the correlation between the movement of the head 9 on the cylindrical guide pin 8 and the pivoting of the articulated parallelogram joint 10 relative to the head 9 is obtained by virtue of the fact that one of the two connecting rods 16 has an appendage 33 with a cam surface 34 which is in engagement with a peg 35 projecting from the upper body 5. The cam coupling between the peg 35 and the appendage 33 is arranged in such a way that, when the articulated parallelogram joint 10 pivots under the action of the cable 30, the head 9 is also moved along the cylindrical guide pin 8 due to the engagement of the surface 34 on the peg 35.

Figure 5:
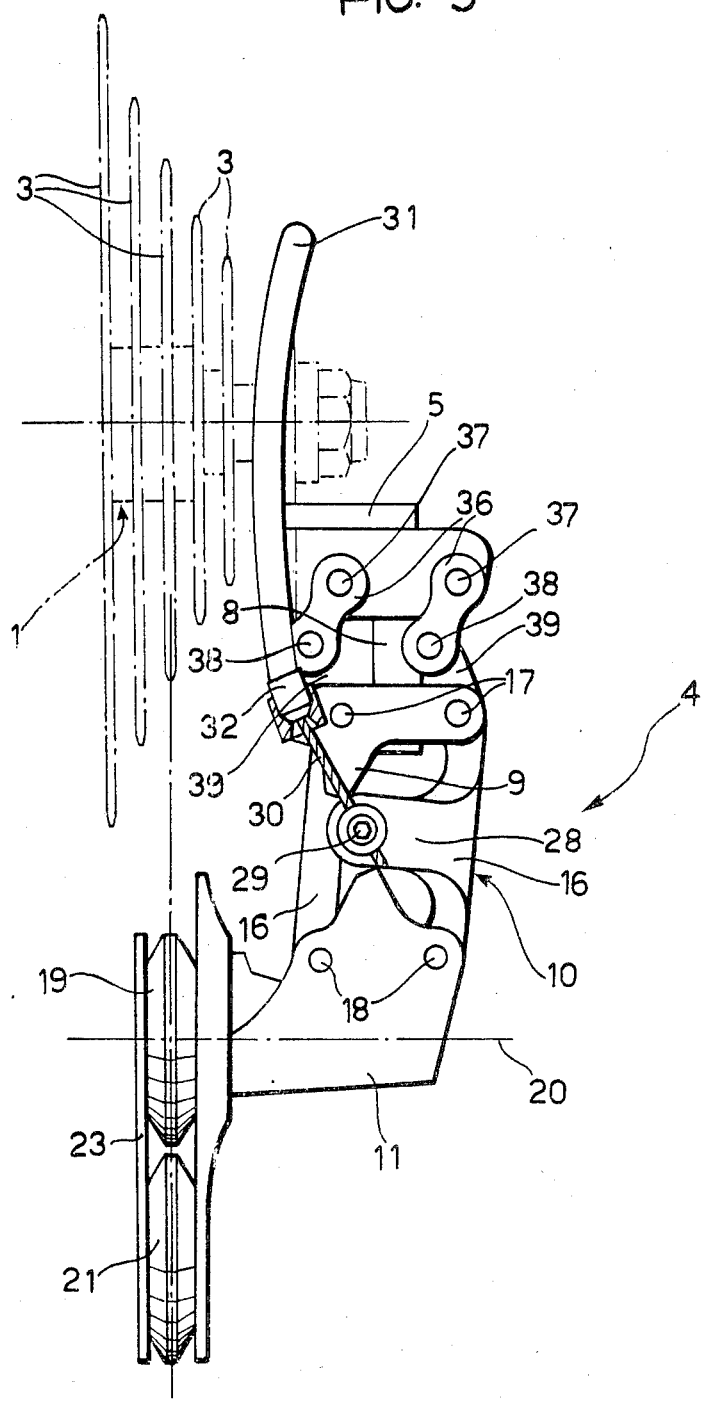

FIG. 5 shows a further variant in which the correlation of the two movements of the connection system between the upper body and the lower body is obtained by means of a toggle joint including one or more auxiliary connecting rods 36 (in the example illustrated in FIG. 5, two of these rods are visible) articulated at 37 to the upper body 5 of the derailer and at 38 to appendages 39 which are fast with the two connecting rods 16 of the articulated parallelogram joint 10. With reference to FIG. 5, when the flexible cable 30 is operated to cause clockwise pivoting of the connecting rod 16 relative to the pins 17, this pivoting causes a corresponding rotation of the appendage 39 and a consequent anticlockwise rotation of the connecting rods 36 about the pins 37. This rotation causes a variation in the distance of the pins 17 from the pins 37 and a consequent movement of the head 9 on the cylindrical guide pin 8.

Naturally, the principle of the invention remaining the same, details of construction and forms of embodiment may be varied widely with respect to those described and illustrated purely by way of example, without thereby departing from the scope of the present invention.

I claim:

1. A rear derailleur for bicycle gears, comprising:
    an upper body which can be fixed to the bicycle frame,
    a lower body carrying transmission means for the chain of the bicycle and being movable relative to the upper body to bring the chain into selective engagement with a series of sprockets carried by the hub of the rear wheel of the bicycle, and
    an articulated parallelogram joint having connecting rods and connecting the lower body to the upper body,
    wherein the derailleur further includes guide means carried by the upper body and an intermediate connecting element which is slidably mounted on the guide means and to which the lower body is directly connected by the articulated parallelogram joint, and wherein means are provided for univocally correlating the movements of the intermediate element relative to the upper body with the movements of the lower body relative to the intermediate element, so that the resulting movement of the lower body relative to the upper body has both a component along an axis of the hub of the rear wheel and a component radial to that axis.

2. A derailleur according to claim 1, wherein the intermediate element is mounted for sliding on the guide means in a direction contained in a plane substantially perpendicular to the axis of the hub, and the articulated parallelogram joint enables movement of the lower body relative to the intermediate element in a direction which has a component along the axis of the hub.

3. A derailleur according to claim 2, wherein a connecting rod of the articulated parallelogram joint has an appendage and the means for correlating the movements of the intermediate element relative to the upper body with the movements of the lower body relative to the intermediate element comprise a toggle joint including at least one auxiliary connecting rod articulated at its ends to the upper body and to the said appendage.

4. A derailleur according to claim 2, wherein the axes of pivoting of the articulated parallelogram joint are perpendicular to the axis of the hub of the rear wheel of the bicycle.

5. A derailleur according to claim 2, wherein the axes of pivoting of the articulated parallelogram joint are inclined to a plane perpendicular to the axis of the hub of the rear wheel of the bicycle.

6. A derailleur according to claim 1, wherein the means for univocally correlating the movements of the intermediate element relative to the upper body with the movements of the lower body relative to the intermediate element comprise an auxiliary connecting rod articulated at its ends to the upper body and to the lower body.

7. A derailleur according to claim 1, wherein a connecting rod of the articulated parallelogram joint has an appendage and the means for univocally correlating the movements of the intermediate body relative to the intermediate element comprise a cam coupling operatively interposed between the upper body and the said appendage.

8. A derailleur according to claim 1, wherein the intermediate connecting element is mounted for sliding on a cylindrical guide pin fixed to the upper body of the derailleur, and an element made from a material with a low coefficient of friction is interposed between the intermediate connecting element and the pin.

* * * * *